United States Patent
Prospero et al.

(10) Patent No.: US 9,890,684 B2
(45) Date of Patent: Feb. 13, 2018

(54) METHOD OF OPERATING AN EXHAUST GAS AFTERTREATMENT

(71) Applicant: MTU Friedrichshafen GmbH, Friedrichshafen (DE)

(72) Inventors: Andrea Prospero, Langenargen (DE); Tim Späder, Langenargen (DE); Stefan Merk, Bad Waldsee (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 43 days.

(21) Appl. No.: 14/897,051

(22) PCT Filed: Jun. 3, 2014

(86) PCT No.: PCT/EP2014/001489
§ 371 (c)(1),
(2) Date: Dec. 9, 2015

(87) PCT Pub. No.: WO2014/198386
PCT Pub. Date: Dec. 18, 2014

(65) Prior Publication Data
US 2016/0131012 A1    May 12, 2016

(30) Foreign Application Priority Data
Jun. 11, 2013   (DE) .................. 10 2013 210 898

(51) Int. Cl.
*F01N 3/00* (2006.01)
*F01N 3/02* (2006.01)
(Continued)

(52) U.S. Cl.
CPC ............ *F01N 9/002* (2013.01); *F01N 3/023* (2013.01); *F01N 11/00* (2013.01); *F02D 41/029* (2013.01);
(Continued)

(58) Field of Classification Search
CPC .. F01N 11/00; F01N 2550/04; F01N 2560/08; F01N 2900/1611; F01N 3/023;
(Continued)

(56) References Cited

U.S. PATENT DOCUMENTS

| 5,195,316 A | 3/1993 | Shinzawa et al. |
| 6,758,039 B2 * | 7/2004 | Kuboshima ............. F01N 3/023 60/297 |

(Continued)

FOREIGN PATENT DOCUMENTS

| DE | 4041917 A1 | 7/1991 |
| DE | 102008042941 A1 | 4/2009 |

(Continued)

*Primary Examiner* — Phutthiwat Wongwian
*Assistant Examiner* — Diem Tran
(74) *Attorney, Agent, or Firm* — Lucas & Mercanti, LLP; Klaus P. Stoffel (57) ABSTRACT

A method and a device for operating an exhaust gas aftertreatment, wherein a diesel particulate filter is regenerated during the operation, in particular passively regenerated, wherein a corrected differential pressure is calculated from a current differential pressure across the diesel particulate filter at a current exhaust gas volumetric flow rate and with a current correction factor. The current correction factor is determined by determining a lower differential pressure in a predetermined time interval at a defined exhaust gas volumetric flow rate, in particular in a specified exhaust gas volumetric flow rate interval around the defined exhaust gas volumetric flow rate, and comparing the lower differential pressure with a specified current reference value and, depending thereon, calculating a new correction factor or retaining the previous correction factor as the current correction factor.

19 Claims, 5 Drawing Sheets

(51) Int. Cl.
  *F01N 9/00* (2006.01)
  *F02D 41/24* (2006.01)
  *F02D 41/02* (2006.01)
  *F02D 41/14* (2006.01)
  *F01N 11/00* (2006.01)
  *G01L 27/00* (2006.01)
  *F01N 3/023* (2006.01)

(52) U.S. Cl.
  CPC ..... *F02D 41/1448* (2013.01); *F02D 41/2429* (2013.01); *G01L 27/002* (2013.01); *F01N 3/0231* (2013.01); *F01N 2550/04* (2013.01); *F01N 2560/08* (2013.01); *F01N 2900/1406* (2013.01); *F01N 2900/1411* (2013.01); *F01N 2900/1611* (2013.01); *F02D 2200/0812* (2013.01); *Y02T 10/47* (2013.01)

(58) Field of Classification Search
  CPC ................... F01N 3/0231; F01N 9/002; F02D 2200/0812; F02D 41/029; F02D 41/1448; F02D 41/2429; G01L 27/002; Y02T 10/47
  USPC ............................ 60/274, 276, 295, 297, 311
  See application file for complete search history.

(56) References Cited

U.S. PATENT DOCUMENTS

| | | | | |
|---|---|---|---|---|
| 6,928,809 | B2* | 8/2005 | Inoue | F01N 9/002 55/DIG. 30 |
| 6,969,413 | B2* | 11/2005 | Yahata | B01D 46/0063 55/282.3 |
| 7,028,467 | B2* | 4/2006 | Kuboshima | F01N 9/002 60/274 |
| 7,174,706 | B2* | 2/2007 | Kuboshima | F01N 9/002 60/278 |
| 8,762,034 | B2* | 6/2014 | Oguri | B01D 46/0063 60/276 |
| 8,915,067 | B2 | 12/2014 | Oohashi et al. | |
| 2007/0044459 | A1 | 3/2007 | Kariya et al. | |
| 2007/0151231 | A1 | 7/2007 | Rinaldi | |
| 2008/0295483 | A1 | 12/2008 | Scaife et al. | |
| 2010/0031638 | A1 | 2/2010 | Sheidler | |

FOREIGN PATENT DOCUMENTS

| | | |
|---|---|---|
| EP | 2469050 A1 | 6/2012 |
| WO | 2008150372 A1 | 12/2008 |
| WO | 2011079928 A1 | 7/2011 |

* cited by examiner

METHOD OF OPERATING AN EXHAUST GAS AFTERTREATMENT

The present application is a 371 of International application PCT/EP2014/001489, filed Jun. 3, 2014, which claims priority of DE 10 2013 210 898.2, filed Jun. 11, 2013, the priority of these applications is hereby claimed and these applications are incorporated herein by reference.

BACKGROUND OF THE INVENTION

The invention pertains to a method for operating an exhaust gas aftertreatment with a diesel particulate filter and a device for controlling the exhaust gas aftertreatment. The invention also pertains to an exhaust gas aftertreatment and to an internal combustion engine.

It is known from the prior art that diesel particulate filters can be used to remove soot particles from an exhaust gas. Diesel particulate filters can comprise a fine-pored structure—e.g., a ceramic structure or, as described in US 2007-151,231 A, a fine-pored woven steel structure—on the walls of which the soot particles are deposited. It is known that diesel particulate filters can be regenerated. A distinction is made between passive regeneration and active regeneration; in the latter case, the soot particles are burned off at predetermined time intervals and/or after a predefinable trigger signal.

In an exhaust gas aftertreatment system with a passively regenerating diesel particulate filter, advantage is taken of the so-called CRT (Continuous Regeneration Trap) effect, and the diesel particulate filter is thus regenerated continuously, i.e., in particular without a fixed, predefined trigger signal. In the passive regeneration technique, the exhaust gas temperatures of the engine are sufficient under normal operating conditions to ensure the continuous removal of soot from the diesel particulate filter. Under certain conditions, e.g., special climate conditions or long, continuous periods of low-load operation, the regeneration process can be supported by more thorough measures. For example, the exhaust gas temperature of the engine and thus the soot burnoff can be increased significantly for a short time. US 2010-031,638 A, for example, describes implementing a passive regeneration by increasing the engine load. US 2011-265,456 A describes the possibility of increasing the soot burnoff by changing the combustion cycle and thus raising the temperature of the exhaust gas.

To determine a good time for regeneration, various mathematical and simulation or estimation methods for defining the soot load of a diesel particulate filter are described, some of which are quite complicated. It is known from WO 05/116413 that a neuronal network can be trained to determine the load state on the basis of the operating state of the engine, the differential pressure across the diesel particulate filter, and the exhaust gas values. The above-mentioned computational methods are comparatively complicated. In addition, there should be no need to carry out extra measurements to determine the state of the filter.

It is true that, to determine the load of the diesel particulate filter (DPF) and/or the best time for a regeneration process, the load state of the diesel particulate filter can be usefully determined by measuring the differential pressure ($\Delta P$) across the diesel particulate filter. In the simplest case, regeneration by means of a thermomanagement measure as cited above could be initiated whenever a predetermined or calculated reference value for the differential pressure ($\Delta P$) is exceeded.

It has been found, however, that the cause of the differential pressure is comparatively complex. The differential pressure increases over the service life of the diesel particulate filter not only as a result of the loading with soot but also as a result of a loading with ash; the accumulation of ash is a fundamental factor in determining the service life ($T\_L$) of the diesel particulate filter. Whereas soot comprises essentially combustible carbon components, ash is defined as the incombustible component of a filter load, which is almost impossible to remove during operation or which at best requires considerable effort to do so. Thus, DE 1 002 951 describes measures for reducing the amount of ash.

During operation, however, the increase in the differential pressure caused by the ash load leads in particular to the situation that, either a reference value pertaining to the differential pressure for initiating regeneration is reached at an increasingly earlier point, or a reference value calculated on the basis of the combustion ends up being too low. As a result, this leads in the case of a passive regeneration system to the initiation of thermomanagement more frequently than would in fact be necessary, i.e., it would lead regularly to the initiation of thermo-management measure even though the soot load of the diesel particulate filter is not yet critical. It is known from DE 12 034 340 A1, for example, that a combustion calculation for a known fuel specification can be carried out, which also takes into account the ash residues in the diesel particulate filter. It is also desirable, however, to have available an improved method and a device for operating an exhaust gas aftertreatment system by means of which the influence of ash on the differential pressure across a diesel particulate filter of the exhaust gas aftertreatment system can be taken into account, i.e., in particular so that the influence can be determined, in the case of passively regenerating diesel particulate filters.

SUMMARY OF THE INVENTION

This is the starting point of the invention, the goal of which is to propose an improved and nevertheless comparatively simple method and a device, by means of which the influence of ash on the differential pressure across the diesel particulate filter of the exhaust gas aftertreatment can be taken into account, in particular determined, in the case of passively regenerating diesel particulate filters. In particular, the goal is to provide a method and a device which can be implemented with comparatively little effort and which nevertheless operate reliably.

The goal with respect to the method is achieved by the invention in the form of a method for operating an exhaust gas aftertreatment in which a diesel particulate filter is passively regenerated during operation and which comprises the following steps:

measuring a current differential pressure across the diesel particulate filter at a current exhaust gas volumetric flow rate and determining a current correction factor for the differential pressure and calculating a corrected differential pressure from the differential pressure and the current correction factor.

It is provided according to the invention that the current correction factor is determined by means of the following steps:

determining a lower differential pressure in a predetermined time interval at a defined exhaust gas volumetric flow rate; and comparing the lower differential pressure with a specified current reference value.

It is provided according to the invention that, as a function of the comparison, either a new correction factor is calculated or the previous correction factor is retained as the current correction factor. A comparison of the lower differential pressure with a specified current reference value is the criterion which determines whether or not a new correction factor applicable to the lower load is to be given as (a new) current correction factor or whether the previous correction factor can be retained as the (previous) current correction factor (with the previous value).

The invention is based on the idea that, for a passively regenerating diesel particulate filter, it is not possible to know in reality how high the differential pressure is purely on the basis of the ash load, that is, exclusive of the soot load. According to this train of thought, there is no identifiable point in time during the course of operation of an exhaust gas aftertreatment system at which the diesel particulate filter is free of soot. This is an essential difference versus active regeneration methods, in which, after completion of a thermomanagement measure initiated by a trigger signal, that is, at a definable time, it can be assumed that the soot load is at a time-wise local minimum. In passive regeneration systems, therefore, there is no criterion for arriving at a correction pressure which indicates the differential pressure caused by the ash load in such a way that the measured, in particular the current, differential pressure can be corrected. In active regeneration methods, however, there is no need, to this extent, to pursue deliberations of this type.

The invention has now understood, however, that the measured differential pressure can nevertheless be usefully corrected by determining, during the operation of an exhaust gas aftertreatment system, a lower differential pressure at a defined exhaust gas volumetric flow rate in a predetermined time interval. According to this understanding, this lower differential pressure is always causally attributable primarily to the ash load during this period, a period in which the soot load is on a lower level. According to the invention, this lower load is then assigned a current correction factor. Thus, in the presence of a lower differential pressure, the current differential pressure can be corrected by means of the current correction factor determined as just described.

The goal with respect to the device is achieved by a control unit. The control unit is configured to operate an exhaust gas aftertreatment system, in particular an exhaust gas treatment system with a passively regenerating diesel particulate filter, under determination of a corrected differential pressure, the control unit being set up to initiate an additional regeneration step.

The goal also leads to an exhaust gas aftertreatment system having a diesel particulate filter. In an advantageous elaboration, the control unit is integrated into the exhaust gas aftertreatment system. The control unit can also be configured as a component separate from the exhaust gas aftertreatment system, however.

Finally, the invention leads to an internal combustion engine with an engine, a diesel particulate filter, and the above-described exhaust gas aftertreatment system, in particular to a diesel internal combustion engine.

Even though the concept is especially advantageous in the case of passively regenerated diesel particulate filters, i.e., even though it is motivated by the problems which occur in that context, it is not limited to use in such cases. In the case of actively regenerated diesel particulate filters, i.e., especially particulate filters which are regenerated according to a fixed, defined trigger signal, the concept can, in principle, also be applied to correct the differential pressure or to check parameters of active regeneration methods or the like; the concept can in particular contribute to the optimization of the time periods between the thermomanagement measures of active regeneration methods.

The invention advantageously establishes the determination of a corrected differential pressure on a comparatively reliable basis and makes available a comparatively simple determination method for arriving at a corrected differential pressure. In particular, the invention finds a satisfactory compromise between reliability or accuracy on the one hand and realizability or real-time functionality of a determination method for a corrected differential pressure on the other hand.

In particular, the exhaust gas volumetric flow rate can remain in a specified exhaust gas volumetric flow rate interval around the defined exhaust gas volumetric flow rate; in general, it is to be ensured within the scope of the system requirements that the differential pressure determinations are carried out at more-or-less the same exhaust gas volumetric flow rates, so that the values obtained for the differential pressure can be compared with each other.

On the basis of the corrected differential pressure, it is possible, according to an elaboration, for subsequent processes to be started at the correct time, i.e., processes which are dependent on the soot load of the diesel particulate filter. Such a process can be, for example, the sending of the corrected differential pressure to the control device for controlling the exhaust gas aftertreatment, so that, for example, a thermomanagement measure can be executed in an improved manner and/or with an optimized chronological sequence. It is usually possible to prevent a diesel particulate filter with passive regeneration from initiating hard or soft thermomanagement measures too often and thus to prevent the thermomanagement system from consuming additional fuel unnecessarily.

Beyond that, it is also possible, either additionally or alternatively, to send the corrected differential pressure to a central engine control unit (ECU) to correct engine maps, for example, or to correct open-loop or closed-loop control processes or generally to correct processes for which the differential pressure across the diesel particulate filter serves as correcting variable.

Within the scope of an especially preferred elaboration, it is provided that the dependence of the further processes on the comparison comprises the following steps:
  if the lower differential pressure is above the specified current reference value: calculating a new correction factor from a previous correction factor, wherein the new correction factor is assigned to the current correction factor for correspondence; and
  if the lower differential pressure is below the current reference value: retaining the previous correction factor, wherein the current correction factor corresponds to the previous correction factor.

In particular, the current differential pressure is measured regularly, in particular continuously. As a result, it is possible to determine a lower differential pressure from the current differential pressure regularly, i.e., at all times, according to a specified plan, by finding the minimum value on a regular basis, wherein the smallest value in each case is assigned according to the logic "IF current differential pressure <lower differential pressure (old), THEN lower differential pressure (new)=current differential pressure". The lower differential pressure is preferably a minimum differential pressure, in particular a time-wise local minimum and/or a time-wise absolute minimum differential pressure.

Before the measured current differential pressure values are used to determine the correction factor or the corrected differential pressure, they are advantageously filtered and subjected to a plausibility check. This makes it possible to avoid a situation in which the correction is based on outliers in the measurement values or on incorrect measurement values.

It is advantageous to determine a minimum on this basis. In particular, it is provided that the lower differential pressure is a time-wise local minimum differential pressure and/or a time-wise absolute minimum differential pressure.

The lower differential pressure is preferably subjected to a confidence check, wherein a trustworthy value of the lower differential pressure is used for comparison. This is advantageously used to stabilize the process, which is preferably carried out under steady-state operating conditions and in a sufficiently reliable physical operating state of the exhaust gas aftertreatment system. In particular, it is possible to provide for this purpose that the lower differential pressure will have a trustworthy value if it is determined at values of the current exhaust gas volumetric flow rate which are constant over time for a predetermined first confidence period, which values correspond in particular to the value of the defined exhaust gas volumetric flow rate, especially values of the current exhaust gas volumetric flow rate which lie in a specified exhaust gas volumetric flow rate interval around the value of the defined exhaust gas volumetric flow rate; or if, additionally or alternatively, the lower differential pressure remains essentially unchanged as a function of time for a predetermined second confidence period.

Expressed in another way, the determined minimum is trustworthy in particular when the system has been operated for a sufficient period of time within the specified exhaust gas volumetric flow rate and/or the determined minimum has not changed for a sufficient period of time.

In particular, within the scope of an especially preferred elaboration, the acquired, trustworthy minimum is compared with a reference. The reference corresponds especially preferably to the differential pressure of the diesel particulate filter in the new state within the predetermined exhaust gas volumetric flow rate range. If the acquired minimum is greater than the reference, the correction factor is adjusted.

In an advantageous elaboration, the adjustment of the correction factor is carried out in a series of fixed steps. Overly frequent corrections are thus avoided; too much correction is prevented. It is especially advantageous here to guarantee that, before the correction factor is adjusted, a predetermined operating time and a predetermined number of measurement values have been reached before starting the adjustment.

According to an especially preferred elaboration, it has been recognized that the correction factor multiplied by the exhaust gas volumetric flow rate can be assigned to the differential pressure correction value for ash. It is especially advantageous to determine the corrected differential pressure by means of the following steps:

calculating a current correction value (ash $\Delta P\_K\_current$ [mbar]) as the product of the current correction factor (ash $\Delta P\_K$) times the current exhaust gas volumetric flow rate (exhaust gas volumetric flow rate_current);
    then calculating the corrected differential pressure preferably by subtracting the current correction value from the measured differential pressure. This therefore represents an easy method for correcting the measured differential pressure.

If the reference value is exceeded, the current correction factor (ash $\Delta P\_K$) can be advantageously calculated by adding a predetermined constant (const.) to the previous correction factor (ash $\Delta P\_K$ [n−1]). Over the service life of the diesel particulate filter, exactly one constant per each exhaust gas volumetric flow rate can be used. It is also advantageous, however, to store various constants for various overall operating times of the diesel particulate filter. By selecting more suitable constants, the method can thus be easily transferred to different diesel particulate filter configurations and the corresponding engines.

In an advantageous elaboration of the method, a new reference value (Ref-Value) is calculated after the lower differential pressure has exceeded the current reference value; the new reference value is obtained by adding the current reference value (Ref-Value_new) to the product of the current correction factor times the specified exhaust gas volumetric flow rate (ash $\Delta P\_K$×exhaust gas volumetric flow rate_range). By adjusting the reference value, the increasing ash load of the diesel particulate filter is taken into account, so that, upon repeated execution of the method, it is possible to work with a suitable reference value.

Accordingly, this can be stated as follows within the scope of a summary of the especially preferred formulas:

ash $\Delta P\_K\_current$ [mbar]=ash $\Delta P\_K$×exhaust gas volumetric flow rate_current.

In the case that the reference value has been exceeded:

ash $\Delta P\_K$=ash $\Delta P\_K[n-1]$+const., and:

Ref-Value=Ref-Value_new+ash $\Delta P\_K$×exhaust gas volumetric flow rate_range Differential pressure values measured to determine the lower differential pressure are preferably plotted continuously, and from them the lower value is determined in a predetermined time interval at a defined exhaust gas volumetric flow rate. This ensures the continuous monitoring of the differential pressure, and the results of the monitoring can be used simultaneously to correct the differential pressure.

In an advantageous elaboration, the method also comprises a control step, in which the corrected differential pressure $\Delta P$ is compared with a predetermined threshold value; and when the threshold value is exceeded, a regeneration step of the diesel particulate filter is initiated. The method thus makes it possible to initiate a regeneration step as soon as the soot load makes this necessary, without the premature and thus unnecessary initiation of such a step on the basis of the ash load of the diesel particulate filter. A thermomanagement measure is especially preferred as a regeneration step. Thus, the burnoff of soot from the diesel particulate filter can be increased simply by raising the exhaust gas temperature of the engine. Overall, the invention thus makes it possible to avoid overly frequent thermomanagement of the engine and thus to eliminate unnecessary consumption.

Embodiments of the invention are now to be described by way of example on the basis of the drawings. These are not necessarily intended to represent the embodiments to scale; instead, the drawings, where suitable for the purpose of explanation, are in schematic and/or slightly distorted form. With respect to amplifications to the teachings directly derivable from the drawings, reference is made to the relevant prior art. It is to be kept in mind here that many modifications and changes pertaining to the form and details of an embodiment can be undertaken without departing from the general idea of the invention. The features of the invention disclosed in the description, in the drawings, and in the claims can be essential to the elaboration of the invention both individually and in any desired combination. In addition, all combinations of at least two of the features disclosed in the description, in the drawings, and/or in the claims also fall within the scope of the invention. The general idea of the invention is not limited to the exact form or details of the preferred embodiments illustrated and described in the following, nor is it limited to an object which would be limited in comparison to the object claimed in the claims. When ranges of values are indicated, values lying within the cited limits are also intended to be disclosed as limit values and can be used and claimed as desired. For the sake of simplicity, the same reference symbols are used in the following for the same or similar parts or for parts which have the same or a similar function.

Additional advantages, features, and details of the invention can be derived from the following description of the preferred embodiments and from the drawings:

DETAILED DESCRIPTION OF THE INVENTION

Figure 1:
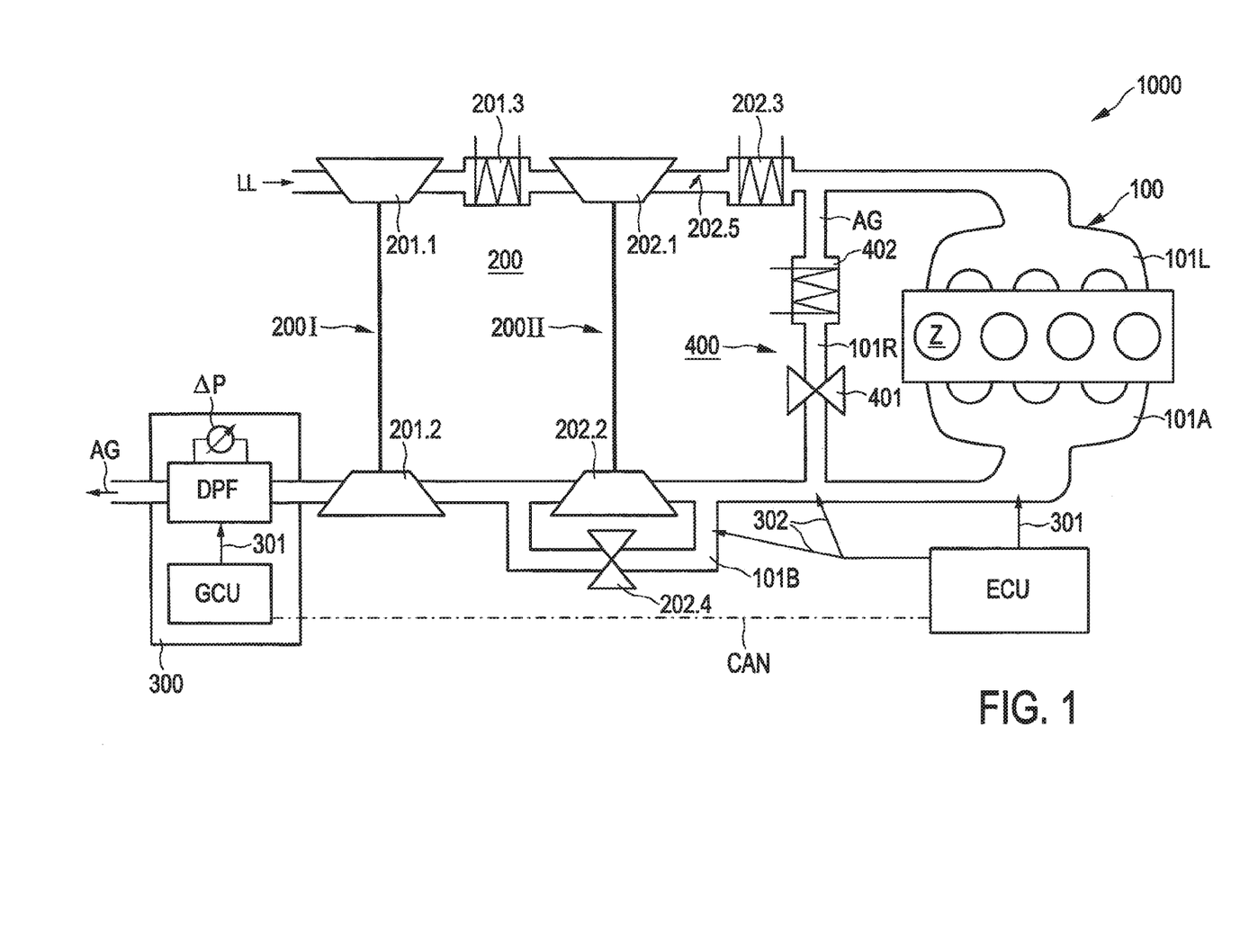
FIG. 1 shows a schematic diagram of a preferred embodiment of an internal combustion engine with an engine, a charger, and a system for exhaust gas aftertreatment with a diesel particulate filter and a device for passive regeneration of the diesel particulate filter.

FIG. 1 shows an internal combustion engine 1000 with an engine 100, a charger 200, and a symbolically indicated exhaust gas aftertreatment system 300 comprising a diesel particulate filter DPF, which can be subjected to thermomanagement measures by means of a control unit GCU for the passive regeneration of the diesel particulate filter DPF. In the present case, the control unit GCU of the exhaust gas aftertreatment is accommodated as a module in a system comprising the exhaust gas aftertreatment system, the diesel particulate filter, and the control unit GCU. In the present case, the control unit for controlling the passive regeneration of the diesel particulate filter—symbolized by the arrow 301—is functionally connected to a central control unit ECU of the internal combustion engine 1000 by a data and control bus CAN. The central control unit ECU, furthermore, as symbolically indicated by the arrows 301, 302 is configured to control the engine 100 and the charger. In the present case, the engine 100 is in the form of a diesel engine, the cylinders Z in the engine block being illustrated symbolically only by way of example; the cylinders are supplied with fuel by a common rail system with appropriate injection (not shown).

The charger 200 is connected to the engine block to supply charging air LL and to carry away exhaust gas AG by way of appropriate intake and exhaust manifolds, i.e., manifold 101L in the charging air line and manifold 101A in the exhaust gas line. The charger 200 is formed in the present case by a first charging stage 200I and a second charging stage 200II, providing an appropriate arrangement of turbochargers, comprising compressors 201.1, 202.1 in the charging air LL line and turbines 201.2, 202.2 in the exhaust gas AG line. Downstream from each of the compressors 201.1, 202.1 is a charging air cooler 201.3, 202.3. The various charging stages, compressors, turbines, and coolers can also be described as low-pressure or high-pressure compressors, turbines, and coolers. The internal combustion engine 1000 and the charging system 200 shown here are described only as one example of an internal combustion engine with an exhaust gas aftertreatment system 300 and are provided only to help explain that system.

The concept of the invention also comprises exhaust gas aftertreatment systems for engines 100 without charging or only with a single-stage charger. In the present case, the charger is in fact set up as a two-stage charger for a large diesel engine; the high-pressure stage (second charging stage 200II) can be shut off by means of a waste gate 202.4 in an exhaust gas bypass line 101B. To control the charging, a throttle valve 202.5 is arranged in the charging air line 101L of the internal combustion engine 1000; this valve can be actuated in cooperation with the waste gate 202.4 to control the charging stages 200II, 200I as needed, depending the load state of the engine 100.

In the present case, the internal combustion engine 1000 is also provided with an exhaust gas return system 400, wherein, in the exhaust gas return line 101R, an exhaust gas return valve 401 and an exhaust gas cooler 402 are arranged to treat the returned exhaust gas AG. The charger 200 and the exhaust gas return system 400 are operated as needed by actuation of the exhaust gas return valve 401 and the waste gate 202.4, as symbolized by the arrows 302.

In the following, the behavior of a differential pressure ΔP at the diesel particulate filter DPF as a function of its soot and ash load is described over the course of its service life T_L and as a function of an exhaust gas volumetric flow rate V_AG. It can be seen that the knowledge of these values of a differential pressure ΔP, as realized by the concept, can be used advantageously to provide a superior method and device for controlling the exhaust gas aftertreatment system 300. For the details, reference is made to the description of FIG. 2, FIG. 3 and FIG. 4, as well as to the description of FIGS. 4 and 5.

Figure 2:
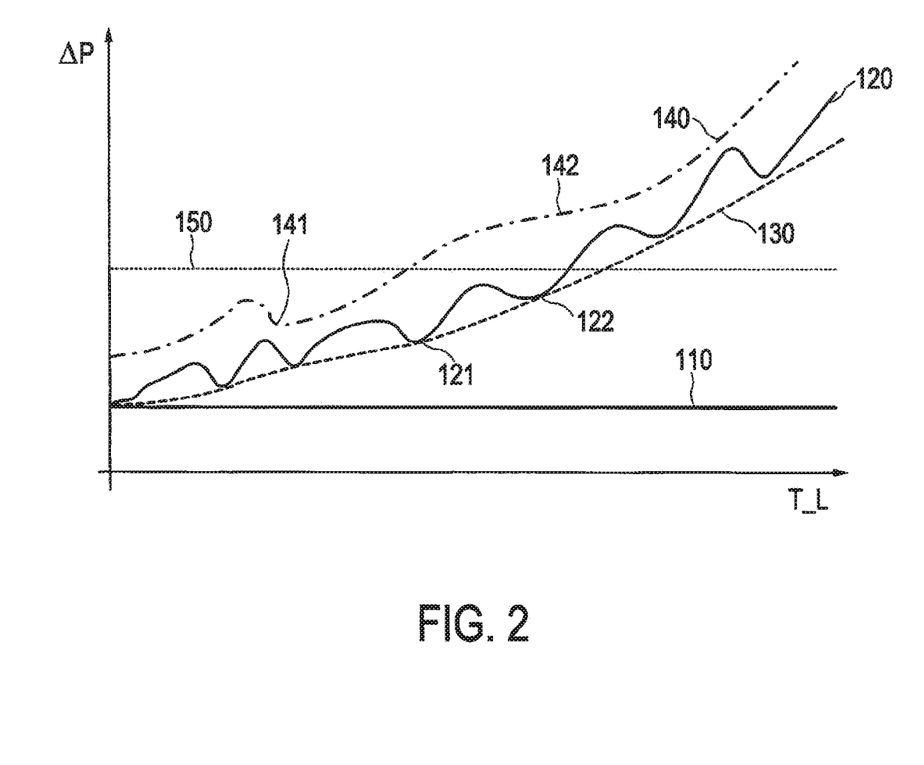
FIG. 2 shows a graph of curves of the differential pressure across a diesel particulate filter during an exhaust gas aftertreatment, as shown for an example of the internal combustion engine of FIG. 1, as a function of the service life of the diesel particulate filter.

FIG. 2 shows a graph of differential pressure curves in a diesel particulate filter over the course of the service life T_L of the diesel particulate filter. The differential pressure ΔP is plotted on the vertical axis (ordinate), the service life T_L on the horizontal axis (abscissa). Without any load of soot or ash, the differential pressure ΔP in diesel particulate filters would remain, in theory, constant over the entire service life T_L. This is represented by the curve 110. Under real operating conditions, however, the diesel particulate filter will become loaded with both soot and ash.

In an actively regenerated system, soot is burned off at predetermined intervals, usually with the help of an additional burner or by the post-injections of fuel. The resulting increase in the exhaust gas temperature causes the diesel soot present in the diesel particulate filter to become oxidized by the excess oxygen present in the exhaust gas. This soot burnoff is usually complete. Expressed differently, the data available on the processes which occur in systems with active regeneration show that there is a point in time after the active regeneration at which there is no longer any soot in the diesel particulate filter, as a result of which the effect of the ash is easier to measure. Curve 120 shows the course of the differential pressure in an actively regenerated system of this type. The differential pressure curve in the actively regenerated system shows various minima 121, 122, which symbolize points after a complete soot burnoff. At these points, the diesel particulate filter is free of soot and is loaded only with ash. During the operation of the engine, there are therefore always states (after an active regeneration) for which it is known that there is no longer any soot in the diesel particulate filter. At these times, it is possible to determine the extent to which the presence of ash affects the differential pressure. Accordingly, all these minima lie on the hypothetical curve of the differential pressure over time in the diesel particulate filter for the case of a load consisting purely of ash, without soot, as shown by curve 130. The course of the differential pressure in the diesel particulate filter loaded purely with ash can be determined in the active system on the basis of the differential pressure minima occurring after complete soot burnoff. On the basis of the differential pressure values after complete soot burnoff, it is also possible to obtain the correction value for the differential pressure $\Delta P$ based on the ash load.

For a passively regenerating system, there are no predetermined times at which complete soot burnoff takes place. There are only states characterized by both soot and ash. There is therefore no time at which only the influence of ash on the differential pressure $\Delta P$ can be measured. In the case of passively regenerating systems, furthermore, it is not known in particular where in the diesel particulate filter the ash has been deposited. Accordingly, the influence of ash on the differential pressure $\Delta P$ can be different in each system. The course of the differential pressure in a diesel particulate filter with passive regeneration is shown by curve 140. Because the soot burnoff in the passively regenerating system proceeds continuously rather than cyclically, there are no states in the passively regenerating diesel particulate filter in which it would be possible to measure reliably the differential pressure $\Delta P$ attributable purely to ash. Thus there is no simple way to correct the measured differential pressure, as can be done in the active system on the basis of the differential pressure after complete soot burnoff. The threshold value 150 for the differential pressure $\Delta P$ indicates the value of the differential pressure $\Delta P$ at which an another regeneration of the diesel particulate filter must be started in order to burn off the accumulated soot. Thermomanagement is activated whenever the differential pressure limit 150 is exceeded. Unless the differential pressure is corrected somehow, regeneration will be initiated too often (or continuously). As can be seen from the graph, the ash load causes this threshold value to be reached more quickly than would be case if the filter were loaded only with soot. In the absence of a correction factor ash $\Delta P\_K$ for the differential pressure $\Delta P$, the additional regeneration step would thus be started too early and unnecessarily. This leads to unnecessary fuel consumption and to an unnecessary load on the diesel particulate filter. According to the present concept, therefore, the measured differential pressure is shifted downward by the ash $\Delta P$ correction, that is, by the current correction factor. As a result, only the effect attributable to soot is taken into account. The differential pressure $\Delta P$ in the diagram shown is plotted at a defined exhaust gas flow rate.

According to the concept of the invention described here, a correction value for the differential pressure $\Delta P$ attributable to the ash load can be determined—in particular for a passively regenerating system—without the necessity for periods during the course of operation in which the differential pressure $\Delta P$ is influenced only by the ash load, i.e., without any contribution from the soot load.

According to the concept of the invention, this type of correction factor is obtained by determining the lower differential pressure $\Delta P$–MIN in a predetermined time interval at a defined exhaust gas volumetric flow rate V_AG, and by comparing this lower differential pressure $\Delta P$–MIN with a specified current reference value. If the lower differential pressure $\Delta P$–MIN obtained with a previous correction factor exceeds the specified current reference value, a new correction factor is calculated, and the current correction factor will then correspond to this new correction factor; and if the lower differential pressure $\Delta P$–MIN falls below the current reference value, the previous correction factor is retained, wherein the current correction factor will then correspond to the previous correction factor. It has been found that a lower differential pressure $\Delta P$–MIN can be determined reliably at, for example, the time-wise local minimum 141 and the time-wise local saddle point 142.

Figure 3:
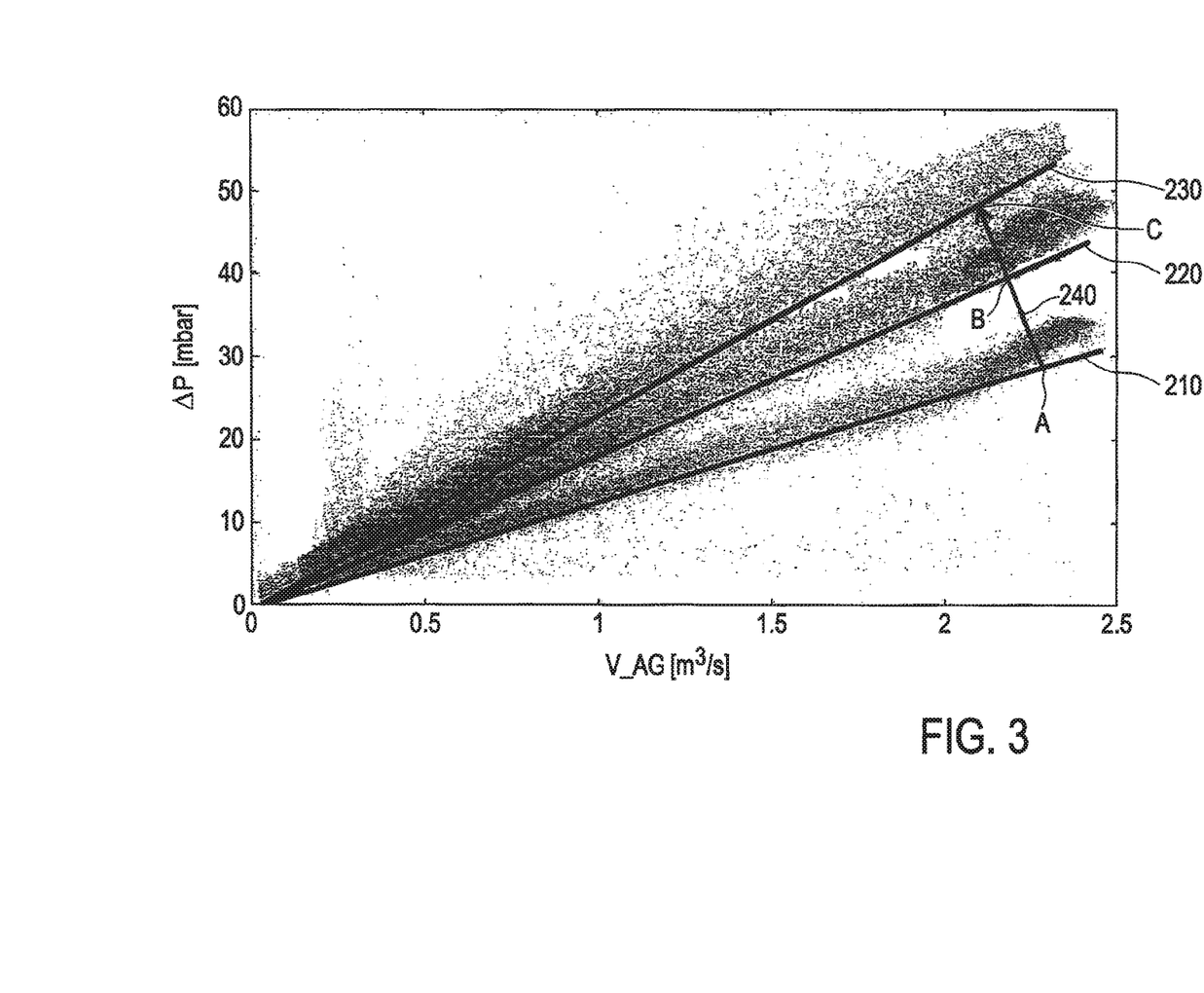
FIG. 3 shows a graph of differential pressure curves measured during an exhaust gas aftertreatment, shown for an example of the internal combustion engine of FIG. 1 as a function of an exhaust gas volume, wherein the differential pressure curves are measured at various times during the service life of a diesel particulate filter.

FIG. 3 shows a graph of the dependence of the measured differential pressure on the exhaust gas volume at various times during the service life of a diesel particulate filter. The increase in the differential pressure can be illustrated on the basis of the symbolized time axis 240, which, in the present case, extends over the course of a year. At time A on the time axis 240, shown on curve 210, the diesel particulate filter is still almost completely free of ash. In the example shown, the differential pressure $\Delta P$ across the diesel particulate filter at time B, symbolized by the curve 220, eight months after time A, has become considerably higher than that at time A. All of the differential pressures shown in this graph were measured in the soot-free state of the diesel particulate filter. Four months later, at time C, shown on curve 230, a further increase in the differential pressure as a result of the additional ash load can be seen. As can be derived from the graph, the increase in the differential pressure caused by ash is proportional to the exhaust gas volume. A regeneration interval, e.g., for a soft or a hard thermomanagement measure, depends on the differential pressure $\Delta P$ across the diesel particulate filter. This differential pressure $\Delta P$ increases over the life of the diesel particulate filter as a result of ash, as illustrated in FIG. 3. Thus, because the differential pressure $\Delta P$ reaches its limit at progressively earlier times, the regeneration interval will become shorter.

If, however, the influence of ash can be determined and/or calculated—as can be done in an especially advantageous manner according to the concept explained here—the regeneration interval can be optimized, e.g., kept constant. This has the result of preventing the unnecessary extra fuel consumption associated with overly frequent regeneration.

Figure 4:
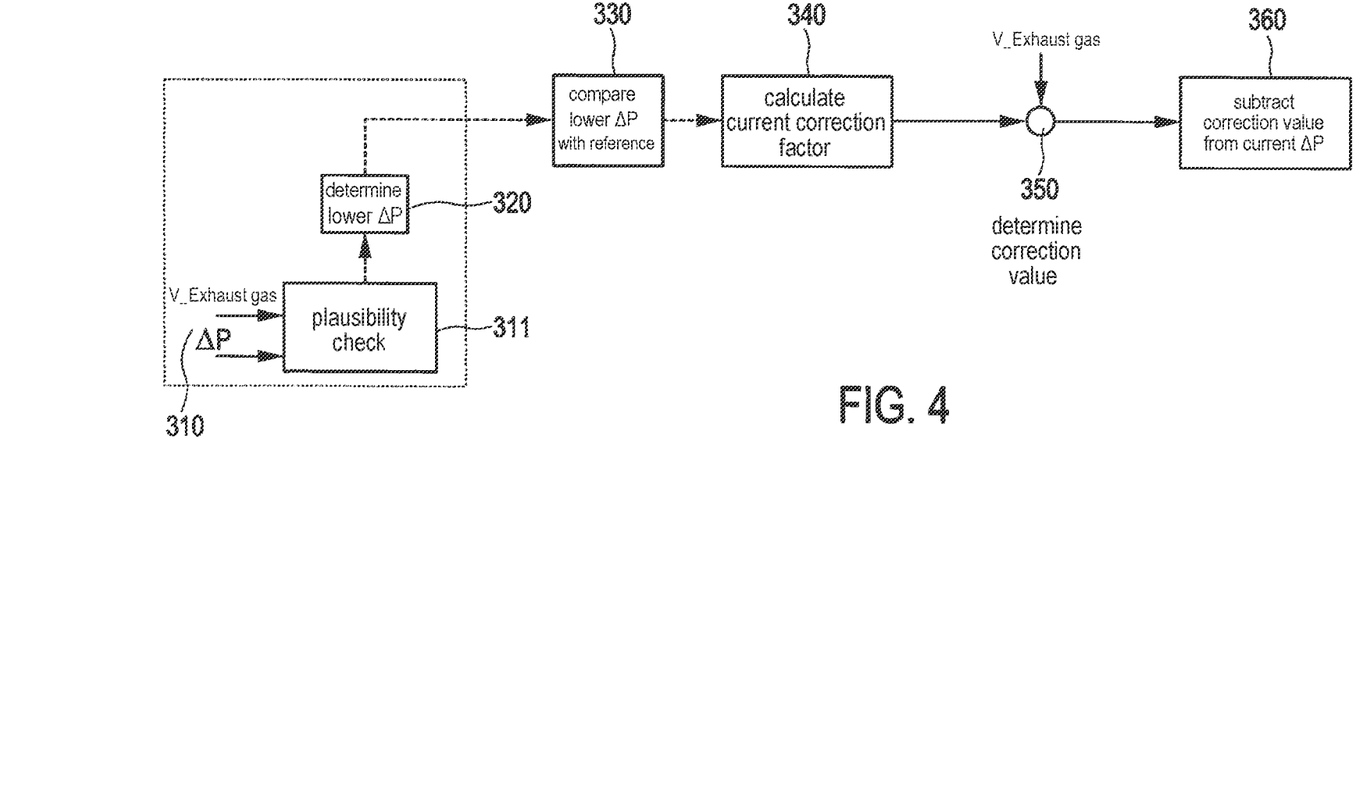
FIG. 4 shows a flow chart of an embodiment of a method for operating an exhaust gas aftertreatment system with a basic structure.

FIG. 4 shows a flow chart of a first embodiment of the method according to the invention. It proceeds on the basis of the following ideas:

the differential pressure is evaluated over time as a function of the volumetric flow rate;

the change in the differential pressure over time is a measure of the ash content; and it should not matter how much ash is deposited or where or what oil is being used.

Accordingly, in step 310, the current differential pressure $\Delta P$ is measured as a function of the exhaust gas volumetric flow rate V-AG. The measured values can be previously filtered and possibly limited and subjected to a plausibility check in step 311 to avoid a situation in which the following steps are based on measurement outliers.

On the basis of the measured values, the lower differential pressure, in particular a "MIN" value, is determined in step 320 for a defined exhaust gas volumetric flow rate in a predetermined time interval. This lower differential pressure ΔP is compared in step 330 with a specified current reference value and, in step 340, a current correction factor is . . . as a function of the result of the comparison between the lower differential pressure ΔP and the reference. Expressed differently, a comparison with the reference (difference) is carried out in step 330 first, and then, in step 340, the slope, i.e., the correction factor, is calculated. The current correction factor is determined in step 340 as follows:

If the lower differential pressure ΔP–MIN is greater than the specified current reference value, then, on the basis of the previous correction factor, a new correction factor is calculated, and this new correction factor is used as the current correction factor. If the lower differential pressure ΔP is lower than the current reference value Ref_Value, then the previous correction factor is retained; that is, the current correction factor corresponds to the previous correction factor. One possible way of determining the current correction factor when the lower differential pressure ΔP exceeds the reference value is to add a predetermined constant to the previous correction factor. Another way of calculating the current correction factor comprises the steps:

recording the lower differential pressures in a predetermined time interval for various exhaust gas volumetric flow rates;

plotting the lower differential pressures as a function of the exhaust gas volumetric flow rates;

forming a straight line from the determined points and determining its slope; and finally subtracting the slope of a reference line from this slope.

In an advantageous embodiment of the method according to the invention, in step 350, on the basis of the previously determined current correction factor and the current exhaust gas volumetric flow rate V_AG in question, a correction value for the differential pressure ΔP is determined at the current exhaust gas volumetric flow rate V_AG. This correction value is subtracted in step 360 from the current differential pressure ΔP, and the result of this subtraction is given out as the corrected differential pressure ΔP. In a following step not shown here, this corrected differential pressure ΔP can be compared with a predetermined threshold value, and, if this threshold value is exceeded, an additional regeneration step of the diesel particulate filter is initiated.

Figure 5:
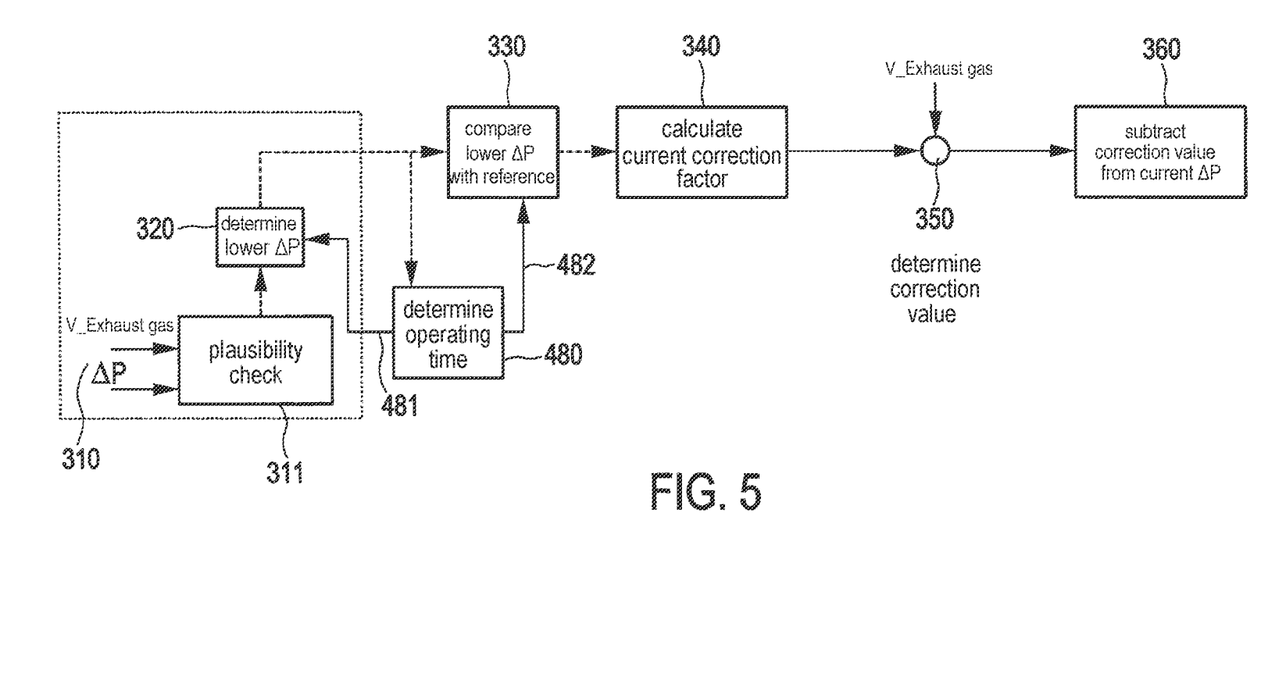
FIG. 5 shows a flow chart of another embodiment of a method for operating an exhaust gas aftertreatment system with an elaborated structure.

FIG. 5 shows a flow chart of another embodiment of the method according to the invention. In addition to the method steps shown in FIG. 4, step 480 is carried out prior to the execution of steps 330-360. In this step, a certain operating time of the diesel particulate filter and a certain number of measurement values must be reached first on the basis of steps 310 and 320, before, in step 481, the lower differential pressure ΔP for a defined exhaust gas volumetric flow rate V_AG in a predetermined time interval is released as trustworthy; simultaneously, in step 482, the lower differential pressure is sent onward for comparison with a current reference value in step 330. Step 480 serves, first, to verify the trustworthiness of the lower differential pressure acquired during the predetermined time interval and, second, as a way of avoiding continuous system corrections, it ensures, through the requirement of a defined operating time, that the adjustment of the correction factor is not carried out too frequently. Step 480 thus preferably comprises a "learning completed" acknowledgement step (remaining below a certain learning threshold for x hours, plus a certain number of values learned).

The invention claimed is:

1. A method for operating an exhaust gas aftertreatment in which a diesel particulate filter is regenerated during operation, comprising the steps of:
    measuring a current differential pressure across the diesel particulate filter at a current exhaust gas volumetric flow rate and determining a current correction factor for a differential pressure; and
    calculating a corrected differential pressure based on the current differential pressure and the current correction factor; and
    initiating a regeneration of the diesel particulate filter when the corrected differential pressure exceeds a predetermined threshold value by increasing an exhaust gas temperature; wherein the current correction factor is determined at least by the steps of:
    determining a lower differential pressure in a predetermined time interval at a defined exhaust gas volumetric flow rate; and
    comparing the lower differential pressure with a specified current reference value, and as a function of that comparison, calculating a new correction factor or retaining the previous correction factor as the current correction factor.

2. The method according to claim 1, wherein the time interval is a specified exhaust gas volumetric flow rate interval around the defined exhaust gas volumetric flow rate.

3. The method according to claim 1, wherein
    when the lower differential pressure is above the specified current reference value a new correction factor is calculated based on the previous correction factor, wherein the new correction factor is assigned to the current correction factor for correspondence; and
    when the lower differential pressure is below the specified current reference value the previous correction factor is retained, wherein the current correction factor corresponds to the previous correction factor.

4. The method according to claim 1, wherein the current differential pressure is filtered and/or subjected to a plausibility check and a filtered and/or plausibility-checked value of the current differential pressure is used to determine the correction factor.

5. The method according to claim 4, wherein the filtered and/or plausibility-checked valve of the current differential pressure is used to determine the corrected differential pressure.

6. The method according to claim 1, wherein the lower differential pressure is sent to a confidence check to produce a trustworthy value of the lower differential pressure that is used for the comparison.

7. The method according to claim 6, wherein the lower differential pressure has the trustworthy value if the lower differential pressure is acquired at values of a current exhaust gas volumetric flow rate which are constant as a function of time for a predetermined first confidence period, which values correspond to a value of the defined exhaust gas volumetric flow rate; and/or
    the lower differential pressure remains essentially unchanged as a function of time for a predetermined second confidence period.

8. The method according to claim 7, wherein the values correspond to values of the current exhaust gas volumetric flow rate which lie in a specified exhaust gas volumetric flow rate interval around the value of the defined exhaust gas volumetric flow rate.

9. The method according to claim 6, wherein the lower differential pressure is a time-wise local minimum and/or a time-wise absolute minimum differential pressure.

10. The method according to claim 1, wherein the specified current reference value is a reference differential pressure value of the diesel particulate filter in a new state or in a preferred load state of the diesel particulate filter.

11. The method according to claim 1, wherein the calculation of the corrected differential pressure based on the current differential pressure and the current correction factor comprises the steps of:
calculating a current correction value as a product of the current correction factor times a current exhaust gas volumetric flow rate; and
calculating the corrected differential pressure by subtracting the current correction value from the current differential pressure.

12. The method according to claim 1, wherein, if the lower differential pressure is above the specified current reference value, the new correction factor is calculated by adding a defined constant to the previous correction factor.

13. The method according to claim 1, wherein, if the lower differential pressure is above the specified current reference value, a new reference value is calculated that is obtained by adding the current reference value to a product of the current correction factor times the defined exhaust gas volumetric flow rate.

14. The method according to claim 1, wherein the current differential pressure is measured regularly; values of the current differential pressure for determining the lower differential pressure are plotted regularly and the lower differential pressure is determined based on plotted values of the current differential pressure in a predetermined time interval at a defined exhaust gas volumetric flow rate.

15. The method according to claim 14, wherein the current differential pressure is measured continuously and the values of the current differential are plotted continuously.

16. The method according to claim 1, wherein the regeneration includes a thermomanagement.

17. A device for controlling an exhaust gas aftertreatment system with a diesel particulate filter, wherein the device is configured to carry out a method according to claim 1.

18. An exhaust gas aftertreatment system comprising: a diesel particulate filter; and a device according to claim 17.

19. An internal combustion engine comprising: an engine; and an exhaust gas aftertreatment system according to claim 18.

* * * * *